US009544269B2

(12) United States Patent
Brzozowski et al.

(10) Patent No.: US 9,544,269 B2
(45) Date of Patent: Jan. 10, 2017

(54) LOGICAL ADDRESS CONFIGURATION AND MANAGEMENT

(71) Applicant: Comcast Cable Communications, LLC, Philadelphia, PA (US)

(72) Inventors: John Jason Brzozowski, Schwenksville, PA (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 320 days.

(21) Appl. No.: 13/874,827

(22) Filed: May 1, 2013

(65) Prior Publication Data

US 2014/0330943 A1 Nov. 6, 2014

(51) Int. Cl.

*G06F 15/177* (2006.01)
*H04L 29/12* (2006.01)

(52) U.S. Cl.

CPC ....... *H04L 61/2015* (2013.01); *H04L 61/6059* (2013.01); *H04L 61/6068* (2013.01)

(58) Field of Classification Search

CPC .................................................. H04L 61/2015
USPC ........................................................ 709/220
See application file for complete search history.

(56) References Cited

U.S. PATENT DOCUMENTS

| | | | | |
|---|---|---|---|---|
| 7,051,089 | B1 * | 5/2006 | Johnson | H04L 29/12273 709/220 |
| 7,068,597 | B1 * | 6/2006 | Fijolek | H04L 41/0853 370/230 |
| 7,107,326 | B1 * | 9/2006 | Fijolek | H04L 61/2015 709/220 |
| 8,725,852 | B1 * | 5/2014 | Boddu et al. | 709/221 |
| 2002/0040405 | A1 * | 4/2002 | Gold | 709/231 |
| 2007/0242815 | A1 * | 10/2007 | Lee et al. | 379/102.03 |
| 2008/0162702 | A1 * | 7/2008 | Jia | H04L 12/2856 709/227 |
| 2008/0189484 | A1 * | 8/2008 | Iida et al. | 711/114 |
| 2008/0259925 | A1 * | 10/2008 | Droms et al. | 370/392 |
| 2010/0124231 | A1 * | 5/2010 | Kompella | H04L 45/04 370/401 |
| 2012/0131153 | A1 * | 5/2012 | Schmidt et al. | 709/220 |
| 2012/0198130 | A1 * | 8/2012 | Noborikawa et al. | 711/103 |

* cited by examiner

*Primary Examiner* — Hua Fan
*Assistant Examiner* — Karina J Garcia-Ching
(74) *Attorney, Agent, or Firm* — Ballard Spahr, LLP

(57) ABSTRACT

Methods and systems for configuring a network are disclosed. An example method can comprise receiving a request from a first device to connect to a first network. An example method can also comprise determining a first logical address. The first logical address can comprise one or more bits configured to identify the first device on the first network and specify configuration information for the first device. An example method can further comprise providing the first logical address to the first device.

20 Claims, 5 Drawing Sheets

Human Machine Interface 502
Processor 503
Mass Storage Device 504
Operating System 505
Addressing Software 506
Addressing Data 507
Display Adapter 509
Input/Output Interface 510
Network Adapter 508
System Memory 512
BUS 513
Display Device 511
Network 515
Remote Computing Device 514a
Remote Computing Device 514b
Remote Computing Device 514c
Computer 501

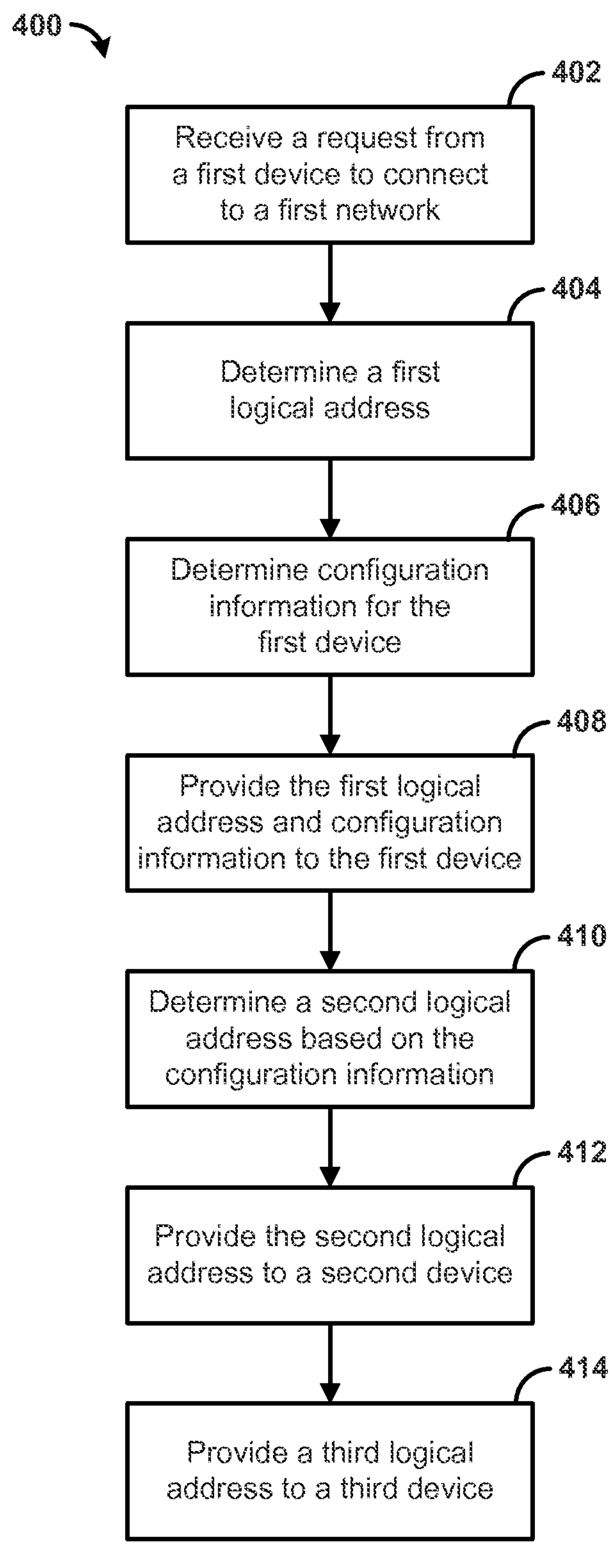
FIG. 4
400
402
Receive a request from a first device to connect to a first network
404
Determine a first logical address
406
Determine configuration information for the first device
408
Provide the first logical address and configuration information to the first device
410
Determine a second logical address based on the configuration information
412
Provide the second logical address to a second device
414
Provide a third logical address to a third device

LOGICAL ADDRESS CONFIGURATION AND MANAGEMENT

BACKGROUND

To extend network access within or around a premises, users often connect additional network devices, such as routers. Due to network address translation and other configuration issues, providing content to devices connected to these additional network devices can create challenges in delivering content at specified quality levels. Thus, there is a need for more sophisticated methods and systems for configuring networks.

SUMMARY

It is to be understood that both the following general description and the following detailed description are exemplary and explanatory only and are not restrictive, as claimed. Provided are methods and systems for configuring and managing a network. In one aspect, an example method can comprise receiving a request from a first device to connect to a first network. A first logical address can be determined In one aspect, the first logical address can comprise one or more bits configured to identify the first device on the first network and specify configuration information for the first device. Furthermore, the first logical address can be provided to the first device.

In another aspect, an example method can comprise receiving a first logical address configured to identify a first device on a first network. One or more bits of the first logical address can be identified as configuration information for a second network. A second logical address can be provided to a second device. In one aspect, the second logical address can be based on the configuration information.

In another aspect, an example method can comprise receiving a request from a first device to connect to a first network. A first logical address can be determined In one aspect, the first logical address can comprise one or more bits configured to identify the first device on the first network. Configuration information for the first device can be determined The first logical address and the configuration information can be provided to the first device. A second logical address can be determined based on the configuration information. The second logical address can be provided to a second device on a second network.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a flowchart illustrating yet another example method for configuring and managing a network.

DETAILED DESCRIPTION

Figure 1:
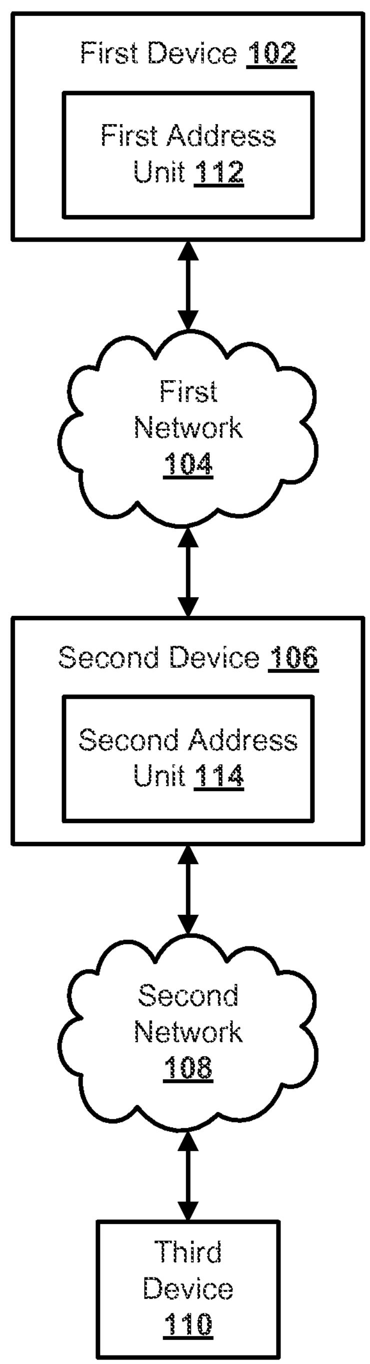
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Some aspects of the present disclosure relate to providing configuration information for one or more networks. In one aspect, configuration information can be provided in a logical address, such as an Internet Protocol address. The logical address can identify a receiving device on a first network. The configuration information can comprise one or more bits of the logical address. For example, the one or more bits can be used to define a network mask (e.g., subnet mask) or a range of possible logical addresses that the receiving device can use to provision addresses for devices on a second network. In one aspect, the first network and second network can implement different logical addressing systems. The configuration information can allow a content provider, service provider, user, and/or other entity more control when communicating content to one or more subnetworks configured according to the configuration information.

FIG. 1 is a block diagram illustrating various aspects of an example system 100 in which the present methods and systems can operate. One skilled in the art will appreciate that provided herein is a functional description and that the respective functions can be performed by software, hardware, or a combination of software and hardware. Those skilled in the art will appreciate that present methods may be used in systems that employ both digital and analog equipment.

In one aspect, the system 100 can comprise a first device 102 configured to communicate with one or more devices through a first network 104. For example, the system 100 can comprise a second device 106 communicatively coupled to the first device 102 through the first network 104. The second device 106 can be configured to communicate with one or more devices through first network 104 and/or a second network 108. For example, the system 100 can comprise a third device 110 communicatively coupled to the second device 106 through the second network 108. In one aspect, the first network 104 and/or second network 108 can comprise wireless and/or physical network communication links. For example, the first network 104 and/or second network 108 can comprise an optical fiber network, a coaxial cable network, a hybrid fiber-coaxial network, an Ethernet network, a wireless network, a satellite network, a direct broadcast network, or any combination thereof.

In one aspect, the first device 102 and/or second device 106 can separately or together comprise one or more of a headend device, network provisioning device, edge device, gateway, router, switch, server, set top box, smart phone or other mobile device, tablet device, laptop device, television, digital streaming device, digital television adapter, computing device and/or the like. In one aspect, the third device 110 can comprise a user device. For example, the third device 110 can comprise a set top box, mobile device, tablet device, laptop device, television, digital streaming device, digital television adapter, computing device, and/or the like.

As an illustration, the first network 104 and second network 108 can be implemented at the user's (e.g., customer's) premises (e.g., home location, business location). For example, the first device 102 can comprise a first router at a user's premises, the second device 106 can comprise a second router at a user's premises, and the third device 110 can comprise a user device at a user's premises. For example, the second router can be configured to extend a wireless network throughout the user's premises. The user's premises can comprise physical structures (e.g., buildings, houses) and surrounding property. For example, the second device 106 and/or third device 110 can be a mobile device (e.g., smartphone) that moves outside of physical structures but remains able to communicate with other devices (e.g., through wireless communication links). As another illustration, the first device 102 can be located at a headend of a network service provider, the second device 106 can comprise a router located at a user's premises, and the third device 110 can comprise a user device located at the user's premises.

In one aspect, the first device 102 can comprise a first address unit 112 configured to provide address information, such as a logical address information to network devices. In one aspect, the first address unit 112 can provide a logical address to each requesting device on the first network 104. The logical address can be configured to locate and/or identify the requesting device to enable communication to the requesting device. For example, the first address unit 112 can comprise a logical address server or other computing device configured to provide logical addresses to devices on the first network 104. As a further example, the first address unit 112 can comprise a dynamic host control protocol (DHCP) server configured to provide Internet Protocol addresses. In one aspect, the first address unit 112 can provide the logical addresses comprising Internet Protocol version 6 (IPv6) addresses. In another aspect, the first address unit 112 can be configured to provide logical addresses according to any version of Internet Protocol or other logical addressing protocol.

In one aspect, the first address unit 112 can be configured to provide configuration information to a second device 106 on the first network 104. For example, the first address unit 112 can be configured to provide a logical address comprising the configuration information. In one aspect, a single logical address can both identify the second device 106 and provide configuration information for the second device 106. In another aspect, the first address unit 112 can provide multiple logical addresses to identify the second device 106 and provide configuration information.

In one aspect, the first address unit 112 can provide a delegated prefix (e.g., as a logical address comprising a delegated prefix or as a delegated prefix associated with a logical address) to the second device 106. The delegated prefix can instruct the second device 106 to provide logical addresses according to specified bit values in a logical address. For example, a delegated prefix can comprise a number indicating bits in a logical address that are to be used in determining logical addresses (e.g., to provide during a device provisioning process). An example Internet Protocol version 6 (IPv6) delegated prefix can be represented as 2001:0DB8::/64. In this example, the '/64' indicates that the first 64 bits (e.g., 2001:0DB8:0000:0000) of the IPv6 address are to be used as the first 64 bits in any address provided according to the delegated prefix. Accordingly, the logical addresses provided based on the delegated prefix will all have the same first 64 bits (e.g., 2001:0DB8:0000:0000) followed by any allowed bits selected by the device providing the logical addresses. In one aspect, the '::' can indicate implied zeros (e.g., 2001:0DB8:0000:0000:0000:0000:0000:0000). The forward slash followed by a number is an example of classless interdomain routing (CIDR) notation.

In one aspect, a logical address provided by the first address unit 112 can comprise one or more bits configured to identify a device on the first network 104. For example, the logical address can be a unique network address used for routing data to a device on the first network 104, such as the second device 106. For example, the logical address can be an Internet Protocol address. The logical address can comprise an address according to Internet Protocol version 4 (IPv4), Internet Protocol version 6 (IPv6), another version of Internet Protocol, or other protocol.

In another aspect, the logical address provided by the first address unit 112 can comprise configuration information. For example, one or more bits of the logical address can comprise configuration information for the second device 106. The one or more bits that comprise configuration information can also be used to identify, at least in part, the second device 106. The configuration information can comprise information for configuring the second device 106 to provide logical addresses to devices on the second network 108. For example, the second device 106 can comprise a second address unit 114 configured to provide logical addresses to devices on the second network 108, such as the third device 110.

In one aspect, the second address unit 114 can be configured to identify the one or more bits comprising configuration information in the logical addresses provided by the first address unit 112. For example, the one or more bits can be identified at a predetermined location within the logical address. As an example, the one or more bits can be located at a predetermined number in a sequence of bits of the logical address. As another example, the one or more bits can be identified based on the one or more bits falling within a range of values, or being equal to or equivalent to one or more values. As yet another example, the one or more bits can be identified based on the one or more bits being the most significant bits (e.g., right most bits specified by a delegated prefix) in a logical address or a range of logical addresses. In one aspect, the logical address can comprise a logical address of a delegated prefix (e.g., 2001:0DB8:0000:90FF::/64) and/or a logical address configured to identify the second device 106 on the first network 104 (e.g., 2001:0DB8:0000:90FF::1). For example, both the logical address identifying the second device 106 and the logical address of the delegated prefix can comprise one or more bits as configuration information. These logical addresses can together or separately specify the configuration information. As another example, the one or more bits comprising configuration information can be identified in a field associated with a logical address. The field can be provided as an option and/or sub-element specified according to the delivery protocol. For example, the field can comprise at least one of a type, length, and value element provided in a network packet (e.g., Internet Protocol or other protocol based packet).

The second address unit 114 can be configured to provide logical addresses to the third device 110 based on the configuration information. For example, the one or more bits comprising configuration information can indicate a range of logical addresses. For example, at least a part of a network mask can be derived based on the one or more bits comprising configuration information. For example, the logical address provided by the first address unit 112 can comprise an IPv6 address. The IPv6 address can comprise one or more bits that can indicate one or more IPv4 address for the second device 106 to provide to the third device 110. As an example, the second address unit 114 can be configured to derive at least a part of a logical address by converting the one or more bits from the logical address provided by the first address unit 112 to one or more bits of the logical address derived by the second address unit 114. As a further example, the second address unit 114 can be configured to convert bits in an IPv6 address to bits in an IPv4 address.

In one aspect, an example IPv6 address can comprise 128 bits. These bits can be expressed as eight groups of 16 bits, where each group is separated by a colon (e.g., colon hexadecimal). The bits can be represented as hexadecimal numbers. In some representations, zeros can be omitted. For example, the double colon '::' can indicate that one or groups of zeros are omitted from the representation. In one aspect, the one or more bits configured to indicate configuration information can comprise a group of 64 bits, 32 bits, 16 bits, 8 bits, 4 bits, 2 bits, or any suitable number of bits configured to communicate configuration information.

In one aspect, the one or more bits can be converted from one or more groups of X number of bits to one or more groups of Y number of bits, where X and Y are any suitable values. The one or more groups of X number of bits can comprise bits of an IPv6 address, and the groups of Y number of bits can comprise bits of an IPv4 address. For example, a group of 16 bits from an IPv6 address (e.g., identifying address or delegated prefix) can be converted to two groups of 8 bits of an IPv4 address. As an illustration, the example bits '90FF' (e.g., of an IPv6 address) can be converted to two eight bit groups (e.g., of an IPv4 address), in which one group is based on the '90' and the other group is based on the 'FF'. The two eight bit groups can comprise part of an IPv4 address. For example, an IPv4 address can comprise 32 bits, which can be represented as four eight bit groups. As an illustration, an example IPv4 address range (e.g., network mask, delegated prefix) based on the example bits '90FF' can comprise 10.144.255.0/24, where 144 and 255 are the decimal equivalents of the hexadecimals numbers 90 and FF respectively. In this scenario, the IPv4 addresses can be based on a RFC1918NET10 , address block (e.g., 10.0.0.0). In other scenarios, the IPv4 addresses can be based on other address blocks (e.g., 192.168.0.0, and the like).

In one aspect, the one or more bits of configuration information can comprise configuration information of varying degrees of specificity. For example, the configuration information can specify a unique logical address, a range of logical addresses, or the like. In one aspect, the range of logical addresses can be specified in varying degrees. For example, the range can be specified more explicitly according to the number of bits of configuration information. In another aspect, the configuration information can be optional. For example, the second device 106 can choose whether to use the configuration information according to configuration rules. In one aspect, configuration rules can comprise rules set by a service provider (e.g., network service provider), content provider, and/or other entity. For example, the configuration rules can specify a range of logical addresses. As another example, configuration rules can be based on user settings, a current network configuration (e.g., provisioned addresses or address range), geographic location, network type, time settings, user account level (e.g., basic, premium), and the like. As a further example, if the configuration information conflicts with previously received or programmed configuration information, then the second device 106 can choose to disregard all or a part of the configuration information.

As an illustration, consider the following example in which an example delegated IPv6 prefix of 2001:0DB8::/56can be provided to the second device 106. In this scenario, IPv6 /64 prefixes from 2001:0 DB8:0000:9000::/64 , to 2001:0DB8:0000:90FF::/64 are available based on the /56 IPv6 prefix. In one aspect, the first device 102 can provide a unicast IPv6 address to the second device 106. Assuming an example prefix of 2001:0DB8:0000:0000::/64,the first device 102 can provide (e.g., provision, assign) an example IPv6 based logical address of 2001:0DB8:0000:0000:90FF::1 to the second device 106. This IPv6 address can comprise configuration information that the second device 106 can use to derive IPv4 addresses. For example, the most significant bits (e.g., the right most bits specified by a delegated prefix, in this case '90FF') in the assigned IPv6 address can indicate a subnet address for the second device 106 to use in provisioning devices on the second network based on, for example, IPv4.

In one aspect, the second address unit 114 can provide logical addresses based on a base range of logical addresses. As an example, an IPv4 address range of 10/8, 192.168/16, or the like can be selected as a base range for the second network 108. For example, the second device 106 can be preconfigured with the base range, or the base range can be provided (e.g., transmitted, communicated) to the second device 106 as part of the logical address provisioning process. As such, the resulting example IPv4 , address for the second device 106 can comprise 10.144.255.0/24. As explained above, '144' can be derived from '90' and '255' can be derived from the 'FF' in the right most significant bits of the example IPv6 , address provided to the second device 106. In one aspect, the first device 102 can use standard protocol exchanges based on stateful DHCPv6, to provision the second device 106.

As another illustration, the first device 102 can provide a logical address and a delegated prefix of 2001:0DB8:0000:9000::/64, to the second device 106. The second device 106 can also be provided an IPv4, base range of 10/24. In one aspect, the second device 106 can identify the '00' bits in the '0000' or '9000' bit section as configuration information. Accordingly, the second device 106 can identify a subnet of 10.0.0.0/24, in which the '0' bit marked in bold font is determined based on the '00' bits provided from the first device 102. For example, the second address unit 114 can determine the '0' bits by converting the '00' hexadecimal bit values to an equivalent bit value of '0' in decimal.

In one aspect, the system 100 can comprise additional devices communicatively coupled to the first device 102, second device 106, and/or third device 110. For example, the first device 102 can be located at a user's premises and communicatively coupled to a device controlled by a content and/or service provider through a content distribution or access network. In another aspect, the third device 110 can comprise an address unit comprising the functionality of the first address unit 112 and/or second address unit 114. For example, the third device 110 can receive configuration information from the first device 102 and/or second device 106 and provide logical addresses to additional devices. The additional devices can be connected to the second network 108 and/or additional networks coupled to the third device 110.

Figure 2:
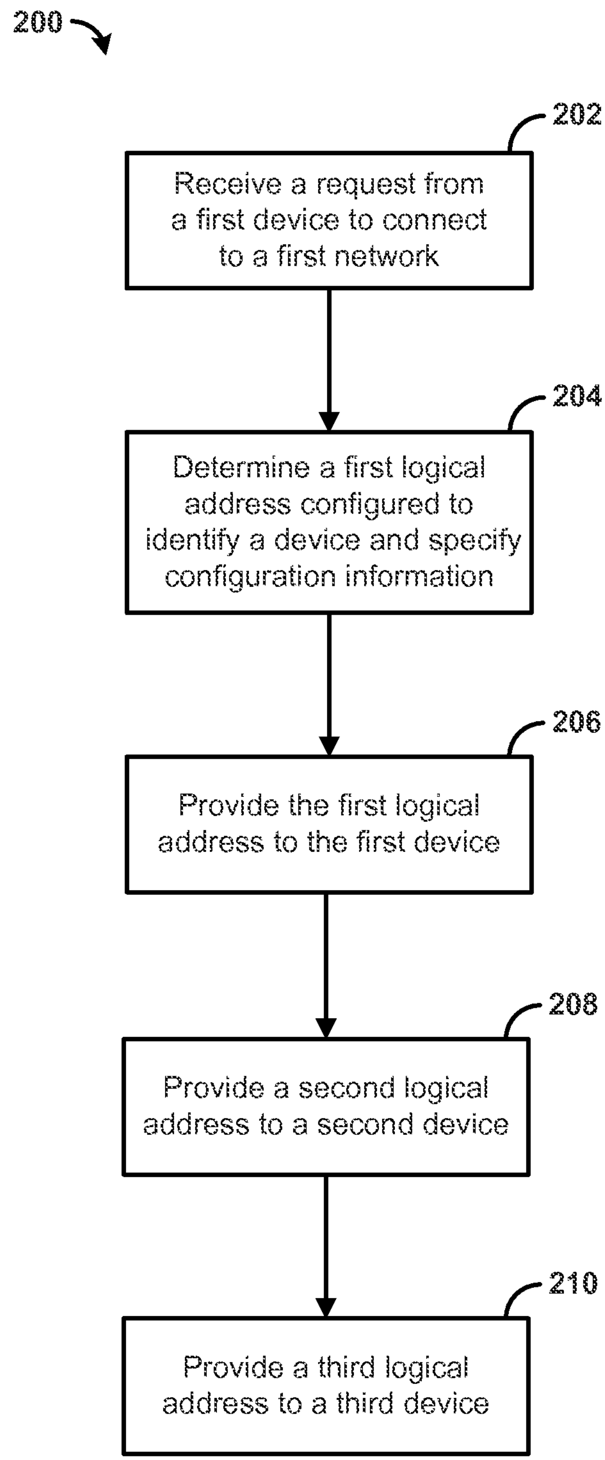
FIG. 2 is a flowchart illustrating an example method for configuring and managing a network.

FIG. 2 is a flowchart illustrating an example method 200 for configuring a network. In step 202, a request can be received from a first device to connect to a first network. As an example, the first device can comprise a first network router, gateway, provisioning device (e.g., DHCP server), set top box, digital streaming device, television, tablet device, mobile device (e.g., smart phone), laptop device, computing device, and the like.

In step 204, a first logical address can be determined. For example, the first logical address can comprise a first Internet Protocol version 6 address (e.g., as a unique identifier on a network, or as part of or associated with a delegated prefix). However, the first logical address can comprise an address according to Internet Protocol version 4, another version of Internet Protocol, or other protocol for providing network addresses. The first logical address can comprise a logical address configured to identify the first device on a network and/or a logical address specifying a delegated prefix.

In one aspect, the first logical address can comprise one or more bits configured to identify the first device on the first network. In another aspect, the one or more bits can be configured to specify configuration information for the first device. For example, the one or more bits configured to identify the first device can comprise the one or more bits that are configured to specify configuration information. In one aspect, the configuration information can indicate at least a part of a network mask (e.g., subnet mask). The configuration information can specify at least a part of a delegated prefix of the first logical address. For example, a delegated prefix can comprise a number indicating bits in a logical address (e.g., first logical address, logical address of and/or associated with the delegated prefix) that are to be used in provisioning devices and/or providing logical addresses, such as the second logical address to the second device. For example, the delegated prefix can indicate a range of bits available as logical addresses. In one aspect, the configuration information is not limited to configuration information for the first device. For example, the configuration information can also comprise information for a variety of network devices and elements (e.g., gateways, routers, switches, network interfaces, modulators, encoders, user devices, digital streaming devices, servers, and the like). The configuration information can comprise information for network devices and elements on one or more networks and/or subnetworks.

In step 206, the first logical address can be provided (e.g., transmitted, provisioned, assigned) to the first device. For example, the first logical address can be provided to the first device as a part of a provisioning sequence for the first device. As another example, the first logical address can be provided by a network service provider. As an illustration, a provisioning device (e.g., the first device) can provide the first logical address. The provisioning device can comprise a headend, edge device, and/or device (e.g., router) at a user's premises. As an example, the provisioning device can comprise a DHCP server.

In step 208, a second logical address can be provided to a second device on a second network (e.g., when the network connection of the second device is partially or fully configured). For example, the first device can provide the second logical address to the second device. In one aspect, the first device can be configured to provide a second logical address to a second device on a second network. The second logical address can be determined by the configuration information. For example, the configuration information can indicate a network mask, delegated prefix, bits of a logical address, or the like for the second network. In one aspect, the second logical address can comprise a second Internet Protocol version 6 address. However, the second logical address can comprise an address according to Internet Protocol version 4, another version of Internet Protocol, or other protocol for providing network addresses. As an illustration, the second device can comprise a second network router, gateway, provisioning device (e.g., DHCP server), set top box, digital streaming device, television, tablet device, mobile device (e.g., smart phone), laptop device, computing device, and the like.

In step 210, a third logical address can be provided to a third device. For example, the second device can provide the third logical address to the third device. In one aspect, the second device can be configured to provide a third logical address to a third device on a third network. The third logical address can be based on the configuration information. In one aspect, the third logical address can comprise an Internet Protocol version 4 address. However, the third logical address can comprise an address according Internet Protocol version 6, another version of Internet Protocol, or other protocol for providing network addresses.

Figure 3:
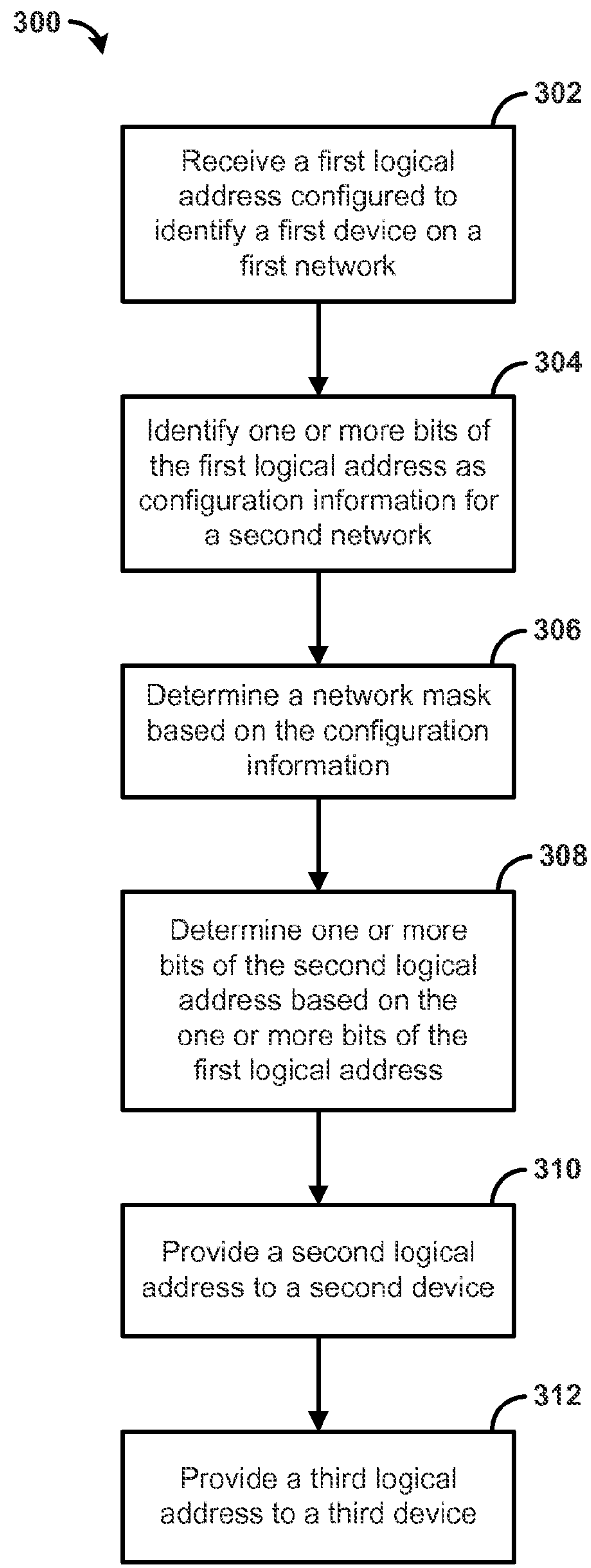
FIG. 3 is a flowchart illustrating another example method for configuring and managing a network.

FIG. 3 is a flowchart illustrating another example method 300 for configuring a network. In step 302, a first logical address configured to identify a first device on a first network can be received. In one aspect, the first device can comprise a first network router, gateway, provisioning device (e.g., DHCP server), set top box, digital streaming device, television, tablet device, mobile device (e.g., smart phone), laptop device, computing device, and the like. In one aspect, the first logical address can comprise a first Internet Protocol version 6 address. However, the first logical address can comprise an address according Internet Protocol version 4, another version of Internet Protocol, or other protocol for providing network addresses. In one aspect, the first logical address can comprise a logical address specifying a delegated prefix.

In step 304, one or more bits of the first logical address can be identified as configuration information for a second network. For example, the one or more bits can be identified at a predetermined location within the logical address. As an example, the one or more bits can be located at a predetermined number in a sequence of bits of the first logical address. As another example, the one or more bits can be identified based on the one or more bits falling within a range of values, or being equal to or equivalent to one or more values. As yet another example, the one or more bits can be identified based on the one or more bits being the right most (e.g. most range narrowing) bits specified by a delegated prefix in a logical address (e.g., or range of logical addresses). In one aspect, the configuration information can comprise information for a variety of network devices and elements (e.g., gateways, routers, switches, network interfaces, modulators, encoders, user devices, digital streaming devices, servers, and the like). The configuration information can comprise information for network devices and elements on one or more networks and/or subnetworks.

In step 306, a network mask can be determined based on the configuration information. In one aspect, the network mask can comprise a subnet mask. In another aspect, the configuration information can comprise at least a part of a delegated prefix for the second logical address. The network mask can be determined based on the delegated prefix. In one aspect, the network mask can comprise a network mask for the first device to use in providing logical addresses to a second device.

In step 308, one or more bits of a second logical address can be determined based on the one or more bits of the first logical address. For example, the one or more bits of the second logical address can be determined based upon a network mask, a delegated prefix, or other configuration information as explained herein. For example, the one or more bits of the second logical address can be bits that are the same or equivalent to the one or more bits of the first logical address.

In step 310, a second logical address can be provided to a second device on a second network (e.g., when the network connection of the second device is partially or fully configured). In one aspect, the second device can comprise a second network router, gateway, provisioning device (e.g., DHCP server), set top box, digital streaming device, television, tablet device, mobile device (e.g., smart phone), laptop device, computing device, and the like. In another aspect, the second logical address can be based on the configuration information. For example, the second logical address can be based on the network mask. The second logical address can comprise an Internet Protocol version 4 address. In another aspect, the second logical address can comprise a second Internet Protocol version 6 address. In another aspect, the second logical address can comprise an address according to another version of Internet Protocol or other protocol for provisioning network devices.

In step 312, a third logical address can be provided to a third device. For example, the second device can provide the third logical address to the third device. In one aspect, the second device can be configured to provide a third logical address to a third device. The third logical address can be based on the configuration information. The third logical address can comprise an Internet Protocol version 4 address. However, the third logical address can comprise an address according Internet Protocol version 6, another version of Internet Protocol, or other protocol for providing network addresses.

FIG. 4 is a flowchart illustrating yet another example method for configuring a network. In step 402, a request to connect to a first network can be received from a first device. As an example, the first device can comprise a first network router, gateway, provisioning device (e.g., DHCP server), set top box, digital streaming device, television, tablet device, mobile device (e.g., smart phone), laptop device, computing device, and the like.

In step 404, a first logical address can be determined. For example, the first logical address can comprise a first Internet Protocol version 6 address. However, the first logical address can comprise an address according to Internet Protocol version 4, another version of Internet Protocol, or other protocol for providing network addresses. The first logical address can comprise a logical address configured to identify the first device on a network and/or a logical address specifying a delegated prefix. In one aspect, the first logical address can comprise one or more bits configured to identify the first device on a first network.

In step 406, configuration information for the first device can be determined The configuration information can be determined based on specifications of a service provider, content provider, or other entity. The configuration information can be determined based on predetermined values or other information unique to a service provider (e.g., logical address ranges). The configuration information can be determined based on a selected or preferred network configuration for a second network. The selected network configuration can be a configuration optimized for content delivery to a device connected to the second network. In one aspect, the configuration information can be determined before the first logical address is determined (e.g., before step 404).

In one aspect, the configuration information is not limited to configuration information for the first device. In one aspect, the configuration information can comprise information for a variety of network devices and elements (e.g., gateways, routers, switches, network interfaces, modulators, encoders, user devices, digital streaming devices, servers, and the like). The configuration information can comprise information for network devices and elements on one or more networks and/or subnetworks.

In another aspect, the one or more bits of the first logical address can be configured to specify the configuration information. For example, the one or more bits configured to identify the first device can comprise the one or more bits that are configured to specify configuration information. In one aspect, the configuration information can indicate at least a part of a network mask (e.g., subnet mask). The configuration information can specify at least a part of a delegated prefix of the first logical address. For example, a delegated prefix can comprise a number indicating bits in a logical address (e.g., first logical address, logical address of and/or associated with the delegated prefix) that are to be used in provisioning devices and/or providing logical addresses, such as the second logical address to the second device. For example, the delegated prefix can indicate a range of bits available as logical addresses.

In step 408, the first logical address and the configuration information can be provided to the first device. For example, the first logical address can be provided to the first device as a part of a provisioning sequence for the first device. As another example, the first logical address can be provided by a network service provider. As an illustration, a provisioning device (e.g., the first device) can provide the first logical address. The provisioning device can comprise a headend, edge device, and/or device (e.g., router) at a user's premises. As an example, the provisioning device can comprise a DHCP server. In one aspect, the configuration information can be provided in a field defined by an addressing protocol (e.g., Internet Protocol). In one aspect, the field defined by the addressing protocol can comprise at least one of a type, length, and value element. In another aspect, the configuration information can be provided as one or more bits in the first logical address, a delegated prefix, and/or the like. The configuration information can be otherwise provided through a communication protocol, pre-configuration process, storage medium, and the like.

In step 410, a second logical address can be determined based on the configuration information. In one aspect, the first device, a provisioning device, or other device can be configured to determine a second logical address based on the configuration information. In one aspect, the configuration information can indicate a network mask, delegated prefix, bits of a logical address (e.g., second logical address), or the like for the second network. In one aspect, the second logical address can comprise a second Internet Protocol version 6 address. However, the second logical address can comprise an address according to Internet Protocol version 4, another version of Internet Protocol, or other protocol for providing network addresses.

In step 412, the second logical address can be provided to a second device on a second network (e.g., when the network connection of the second device is partially or fully configured). In one aspect, the second logical address can be provided as part of a network address provisioning process. For example, the second logical address can be provided to the second device by the first device, or other device (e.g., headend, provisioning device). The second device can comprise a second network router, gateway, provisioning device (e.g., DHCP server), set top box, digital streaming device, television, tablet device, mobile device (e.g., smart phone), laptop device, computing device, and the like.

In step 414, a third logical address can be provided to a third device on a third network. In one aspect, the second device can be configured to provide a third logical address to a third device on a third network. However, the third logical address can be provided by a variety of other devices such as the first device, a provisioning device, and the like. The third logical address can be based on the configuration information. In one aspect, the third logical address can comprise an Internet Protocol version 4 address. However, the third logical address can comprise an address according Internet Protocol version 6, another version of Internet Protocol, or other protocol for providing network addresses.

Figure 5:
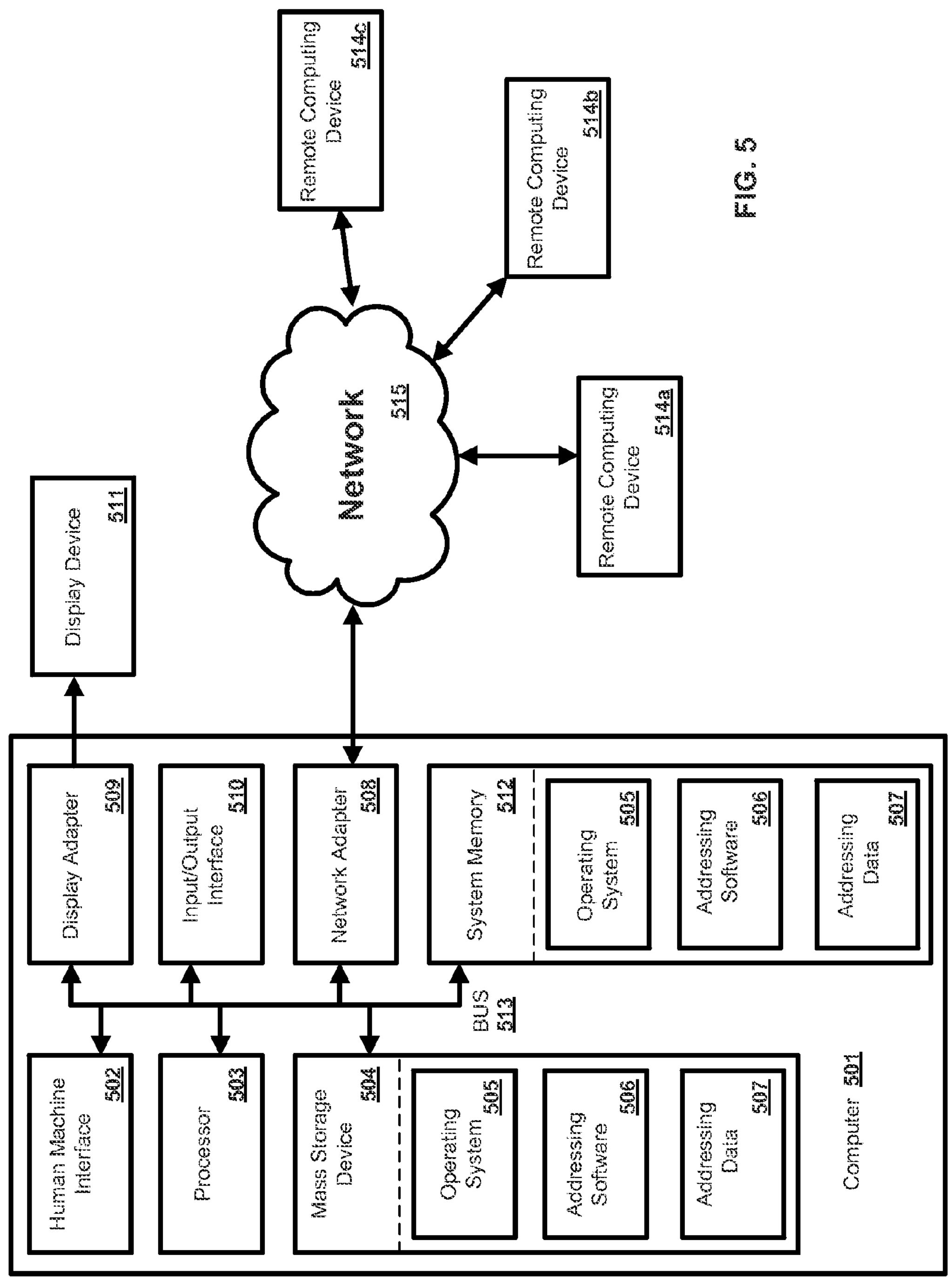
FIG. 5 is a block diagram illustrating an example computing device and network in which the present methods and systems can operate.

In an exemplary aspect, the methods and systems can be implemented on a computer 501 as illustrated in FIG. 5 and described below. By way of example, first device 102, second device 106, and/or third device 110 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, addressing software 506, addressing data 507, a network adapter 508, system memory 512, an Input/Output Interface 510, a display adapter 509, a display device 511, and a human machine interface 502, can be contained within one or more remote computing devices 514*a,b,c*, at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as addressing data 507 and/or program modules such as operating system 505 and addressing software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and addressing software 506. Each of the operating system 505 and addressing software 506 (or some combination thereof) can comprise elements of the programming and the addressing software 506. Addressing data 507 can also be stored on the mass storage device 504. Addressing data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394, Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c*, can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of addressing software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

receiving a request from a first device to connect to a first network;

determining a first network address, wherein the first network address comprises one or more bits configured to identify the first device on the first network and specify configuration information for provisioning, by the first device, one or more other devices on a second network, wherein the configuration information is used by the first device for assigning a second network address for one of the one or more other devices of the second network; and providing the first network address to the first device.

2. The method of claim 1, wherein the first network address comprises a first Internet Protocol version 6 address.

3. The method of claim 1, wherein the configuration information indicates a network mask for the second network.

4. The method of claim 1, wherein the second network address comprises a second Internet Protocol version 6 address.

5. The method of claim 1, wherein the one of the one or more other devices is configured to provide a third network address to a second device on a third network, wherein the third network address is based on the configuration information.

6. The method of claim 1, wherein the configuration information specifies a delegated prefix of the first network address.

7. A method comprising:

receiving a first network address configured to identify a first device on a first network and specify configuration information for provisioning, by the first device, one or more other devices on a second network;

identifying, by the first device, one or more bits of the first network address as the configuration information for provisioning the one or more other devices on the second network; and providing a second network address to one of the one or more other devices on the second network, wherein the second network address is based on the configuration information.

8. The method of claim 7, wherein the first network address comprises a first Internet Protocol version 6 address.

9. The method of claim 7, wherein the second network address comprises an Internet Protocol version 4 address.

10. The method of claim 7, further comprising determining a network mask based on the configuration information, wherein the second network address is based on the network mask.

11. The method of claim 7, further comprising determining one or more bits of the second network address based on the one or more bits of the first network address.

12. The method of claim 7, wherein the second network address comprises a second Internet Protocol version 6 address.

13. The method of claim 12, further comprising providing, by the one of the one or more other devices, a third network address to a second device, and wherein the third network address is based on the configuration information.

14. The method of claim 7, wherein the configuration information specifies a delegated prefix for the second network address.

15. A method comprising:

receiving, by a first device, a request from a second device to connect to a first network;

determining, by the first device, a first network address, wherein the first network address comprises one or more bits configured to identify the second device on the first network and specify configuration information for provisioning, by the second device, one or more other devices on a second network;

providing, by the first device, the first network address to the second device;

determining, by the second device, the configuration information and a second network address based on the configuration information; and providing, by the second device, the second network address for the second network to one of the one or more other devices.

16. The method of claim 15, wherein the second network is a subnetwork of the first network.

17. The method of claim 7, further comprising:

generating a first part of the second network address based on a base value;

generating a second part of the second network address based on the one or more bits of the first network address identified as the configuration information; and generating a third part of the second network address based on a unique number for distinguishing the one of the one or more other devices from other devices on the second network.

18. The method of claim 17, wherein the base value comprises 10 or 192.

19. The method of claim 17, wherein the first part is before the second part and the second part is before the third part in the second network address.

20. The method of claim 1, wherein the second network is a subnetwork of the first network.

* * * * *